United States Patent
Motamed

(10) Patent No.: US 11,117,427 B2
(45) Date of Patent: Sep. 14, 2021

(54) ELECTRO-MAGNETIC COUPLED PIEZOLECTRIC POWERING OF ELECTRIC VEHICLES

(71) Applicant: Siavash Motamed, Scarsdale, NY (US)

(72) Inventor: Siavash Motamed, Scarsdale, NY (US)

(*) Notice: Subject to any disclaimer, the term of this patent is extended or adjusted under 35 U.S.C. 154(b) by 0 days.

(21) Appl. No.: 16/993,527

(22) Filed: Aug. 14, 2020

(65) Prior Publication Data

US 2021/0046788 A1    Feb. 18, 2021

Related U.S. Application Data

(60) Provisional application No. 62/886,994, filed on Aug. 15, 2019.

(51) Int. Cl.
| | |
|---|---|
| *B60C 23/04* | (2006.01) |
| *H02J 50/05* | (2016.01) |
| *H02N 2/18* | (2006.01) |
| *B60C 19/00* | (2006.01) |
| *H02K 7/18* | (2006.01) |
| *H02J 50/10* | (2016.01) |

(52) U.S. Cl.
CPC .......... *B60C 23/0411* (2013.01); *B60C 19/00* (2013.01); *H02J 50/05* (2016.02); *H02N 2/181* (2013.01); *H02J 50/10* (2016.02); *H02K 7/1846* (2013.01)

(58) Field of Classification Search
CPC ...... B60C 23/0411; B60C 19/00; H02J 50/05; H02J 50/10; H02N 2/181; H02K 7/1846
USPC .................................. 73/146.5; 307/9.1, 10.1
See application file for complete search history.

(56) References Cited

U.S. PATENT DOCUMENTS 9,385,636 B2 * 7/2016 Hung ..................... H02N 2/181
9,908,374 B2    3/2018 Dussinger et al.
(Continued)

FOREIGN PATENT DOCUMENTS

EP      0310212 A2    4/1989
WO   2005067073 A1   7/2005
(Continued)

OTHER PUBLICATIONS

International Search Report and Written Opinion dated Nov. 9, 2020 in corresponding PCT/US2020/046535.
(Continued)

*Primary Examiner* — Hal Kaplan
*Assistant Examiner* — Swarna N Chowdhuri
(74) *Attorney, Agent, or Firm* — NovoTechIP International PLLC

(57) ABSTRACT

A device is disclosed, which includes: a charge portion with a plurality of piezoelectric elements embedded in a tire configured for a vehicle, a capacitor mechanically coupled to the tire and electrically coupled to the plurality of piezoelectric elements; a transmitter coil, mechanically coupled to the tire and electrically coupled to the capacitor through a discharge portion; wherein in response to an external radial pressure on the tire resulting from movement of the vehicle which causes a pressure on the plurality of piezoelectric elements, the plurality of piezoelectric elements produce an electrical charge on the capacitor, and wherein the discharge portion electrically connects the electrical charge on the capacitor to the transmitter coil to send electromagnetic power to the vehicle.

20 Claims, 9 Drawing Sheets

(56) References Cited

U.S. PATENT DOCUMENTS

| | | | | |
|---|---|---|---|---|
| 2002/0003474 | A1* | 1/2002 | Mcclelland | B60C 23/0413 340/442 |
| 2004/0078662 | A1 | 4/2004 | Hamel et al. | |
| 2004/0100100 | A1* | 5/2004 | Wilson | F03G 7/08 290/1 R |
| 2007/0295069 | A1* | 12/2007 | Mancosu | B60C 23/0411 73/146 |
| 2010/0164705 | A1* | 7/2010 | Blanchard | B60C 23/0411 340/442 |
| 2010/0186493 | A1* | 7/2010 | Brusarosco | B60C 23/0411 73/146.3 |
| 2012/0255349 | A1* | 10/2012 | Pop | B60C 23/0452 73/146.5 |

FOREIGN PATENT DOCUMENTS

| | | |
|---|---|---|
| WO | 2007099159 A1 | 9/2007 |
| WO | 2009010081 A1 | 1/2009 |
| WO | 2009010082 A1 | 1/2009 |

OTHER PUBLICATIONS

Fuad Un-Noor et al., "A Comprehensive Study of Key Electric Vehicle (EV) Components, Technologies, Challenges, Impacts, and Future Direction of Development," Energies 2017, pp. 1-71.

Thabat Thabet, "An Approach to Calculate the Efficiency for an N Receiver Wireless Power Transfer System," International Journal of Advanced Computer Science and Applications, vol. 6, No. 9, 2015, pp. 91-98.

Frederick W. Grover, "A Comparison of the Formulas for the Calculation of the Inductance of Coils and Spirals Wound with Wire of Large Cross Section," Bureau of Standards Journal of Research, vol. 3, 1929, pp. 163-190.

Patrick J. Kelly, "Chapter 6—Pulse-Charging Battery Systems," pp. 6-1-6-67.

Robert W. Erickson, "DC-DC Power Converters," Wiley Encyclopedia of Electrical and Electronics Engineering, 19 pages.

Luca Caliari et al., "KEMET film capacitors for high temperature, high voltage and high current," CARTS International 2013 Proceedings, 15 pages.

Flemming Moheimani, "Fundamentals of Piezoelectricity," Piezoelectric Transducers for Vibration Control and Damping, Chapter 2, pp. 9-35.

M. Rezal et al., "High voltage magnetic pulse generation using capacitor discharge technique," Alexandria Engineering Journal (2014) 53, 803-808.

web.mit.edu, "Inductance and Magnetic Energy," pp. 11-1-11-53.

Marc T. Thompson, "Inductance Calculation Techniques—Part I: Classical Methods," Power Control and Intelligent Motion, vol. 25, No. 12, Dec. 1999, pp. 40-45.

Marc T. Thompson, "Inductance Calculation Techniques—Part II: Approximations and Handbook Methods," Power Control and Intelligent Motion, vol. 25, No. 12, Dec. 1999, pp. 1-11.

G. F. Kiuttu, "Calculation of Inductive Electric Fields in Pulsed Coaxial Devices Using Electric Vector Potentials," Air Force Research Laboratory, Directed Energy Directorate, 3 pages.

Robert Weaver, "Investigation of E.B. Rosa's Round Wire Mutual Inductance Correction Formula," 2008, pp. 1-12.

Jornsen Reimpell et al., "The Automotive Chassis: Engineering Principles, Second Edition," Mechanical Engineering—SAE, 2001, 454 pages.

Daniel Costinett, "Modeling Power in Electric Vehicles," CURENT, Oct. 15, 2014, 59 pages.

Cevdet Akyel et al., "Mutual Inductance of Thin Coaxial Circular Coils with Constant Current Density in Air (Filament Method)," Proceedings of the 5th WSEAS International Conference on Telecommunications and Informatics, Istanbul, Turkey, May 27-29, 2006 (pp. 168-175).

Benjamin H. Waters et al., "Optimal Coil Size Ratios for Wireless Power Transfer Applications," IEEE, 2014, pp. 2045-2048.

Raymond A. Serway et al., "Physics for Scientists and Engineers," Thomson Brooks/Cole, 2004, one page.

Department of Defense, "Piezoelectric Standard Ceramic Material and Guidelines for Sonar Transducers," MIL-STD-1376B, 1995, 35 pages.

James C. Simpson et al., "Simple Analytic Expressions for the Magnetic Field of a Circular Current Loop," NASA STI Program, 2001, 13 pages.

D. Bruce Montgomery et al., "Some Useful Information for the Design of Air-Core Solenoids," Airforce, 1961, 55 pages.

William R. Smythe, "Static and Dynamic Electricity," McGraw-Hill Book Company, Inc., 1950, one page.

buffalo.edu, "Tire Model in Driving Simulator," 2018, pp. 1-8.

cm-labs.com, "Tire Models," 2018, pp. 1-21.

Eva Palmberg et al., "Wireless Charging—some key elements," Chalmers University of Technology, 2013, pp. 1-69.

Roja Esmaeeli, et al., "A Rainbow Piezoelectric Energy Harvesting System for Intelligent Tires Monitoring Applications," Journal of Energy Resources Technology, 2018, pp. 1-39.

Kai Song et al., "A Review of Dynamic Wireless Power Transfer for In-Motion Electric Vehicles," IntechOpen, 2016, 21 pages.

Y C Shu et al., "Analysis of power output for piezoelectric energy harvesting systems," Institute of Physics Publishing, 2006, pp. 1499-1512.

Markys G Cain et al., "Degradation of Piezoelectric Materials," NFL Report CMMT(A) 148, 1999, 42 pages.

D A van den Ende, et al., "Direct strain energy harvesting in automobile tires using piezoelectric PZT—polymer composites," Smart Mater. Struct. 21 (2012), 12 pages.

Maria Tiikkaja et al., "Electromagnetic interference with cardiac pacemakers and implantable cardioverterdefibrillators from low-frequency electromagnetic fields in vivo," Europace (2013) 15, pp. 388-394.

Somayyeh Hazeri, "Energy Harvesting in Pneumatic Tires through Piezoelectric Material and its Life Cycle Environmental Impact," Concordia University, School of Graduate Studies, 2017, 113 pages.

Xiaoxue Liu et al., "Energy Harvesting in Tire: State-of-The-Art and Challenges," SAE International, 2018, pp. 1-10.

Mikio Umeda et al., "Energy Storage Characteristics of a Piezo-Generator using Impact Induced Vibration," Jpn. J. Appl. Phys., vol. 36, 1997, pp. 3146-3151.

Rubayyat Mahbub et al., "Enhanced dielectric properties of tantalum oxide doped barium titanate based ceramic materials," Procedia Engineering 56 ( 2013 ), pp. 760-765.

Xinchang Liu et al., "Equivalent Piezoelectric Actuator Circuits and Comparison," IEEE/ASME International Conference on Advanced Intelligent Mechatronics (AIM), 2014, pp. 222-226.

H. Abramovich et al., "Experimental Determination of the Maximum Allowable Stresses for High-Power Piezoelectric Generators," Journal of Ceramic Science and Technology, vol. 4, No. 3, 2013, pp. 131-136.

Vytenis Babrauskas et al., "Fusing of Wires by Electrical Current," Fire and Materials, 2011, pp. 769-778.

Yasuyoshi Saito et al., "High Performance Lead-free Piezoelectric Material," R&D Review of Toyota CRDL, vol. 41, No. 2, pp. 22-28.

Johannes Adam et al., "In Search for Preece and Onderdonk," PCB Trace and Via Currents and Temperatures: The Complete Analysis, 2015, 13 pages.

Chang-Hyo Hong et al., "Lead-free piezocerarnics e Where to move on?," Journal of Meteriomics, vol. 2, 2016, pp. 1-24.

C. Keawboonchuay et al., "Maximum Power Generation in a Piezoelectric Pulse Generator," IEEE Transactions on Plasma Science, vol. 31, No. 1, 2003, pp. 123-128.

www.ece.rutgers.edu, "Maxwells Equations," 18 pages.

Stephen R. Platt et al., "On Low-Frequency Electric Power Generation With PZT Ceramics," IEEE/ASME Transactions on Mechatronics, vol. 10, No. 2, 2005, pp. 240-252.

Hiba Najini et al., "Piezoelectric Energy Generation from Vehicle Traffic with Technoeconomic Analysis," Journal of Renewable Energy, vol. 2017, 16 pages.

(56) References Cited

OTHER PUBLICATIONS

Ayan Bhattacharya et al., "Piezoelectric Energy Harvesting in Automobile Wheels," International Journal for Technological Research in Engineering, vol. 5, Issue 11, 2018, pp. 4599-4603

Noaman Makki et al., "Piezoelectric Power Generation in Automotive Tires," Cansmart Cinde IZFP, 2011, 10 pages.

Matthew W. Hooker, "Properties of PZT-Based Piezoelectric Ceramics Between-150 and 250 ° C.," NASA, 1998, 28 pages.

Parviz Tomaraee et al,. "Relationships among the contact patch length and width, the tire deflection and the rolling resistance of a free-running wheel in a soil bin facility," Spanish Journal of Agricultural Research, vol. 13, Issue 2, 2013, pp. 1-7.

Na Kong et al., "Resistive Impedance Matching Circuit for Piezoelectric Energy Harvesting," Journal of Intelligent Material Systems and Structures, vol. 21, 2010, pp. 1293-1302.

Hiba Najini et al., "Investigation on the Selection of Piezoelectric Materials for the Design of an Energy Harvester System to Generate Energy from Traffic," International Journal of Engineering and Applied Sciences, vol. 3, Issue-2, 2016, pp. 43-49.

David P. Scopelliti, "Simplified Pulsed Current (Duty Cycle) Guidelines," Samtech, 2014, pp. 1-4.

Adam Research, "The Adiabatic Wire: "Onderdonk"," TRM White Paper No. 10, 2015, pp. 1-10.

ocw.nthu.edu.tw, "Time Varying Magnetic Fields and Maxwells Equations," 16 pages.

Tonkin, "Piezoelectric Ceramics," vol. 5, 2017, 39 pages.

\* cited by examiner

ELECTRO-MAGNETIC COUPLED PIEZOLECTRIC POWERING OF ELECTRIC VEHICLES

This application claims the benefit of priority from pending U.S. Provisional Patent Application Ser. No. 62/886,994 filed Aug. 15, 2019, and entitled "SYSTEM AND METHOD OF ELECTROMAGNETIC COUPLED PIEZOLECTRIC CHARGING OF VEHICLE BATTERIES", which is incorporated by reference herein in its entirety.

BACKGROUND

Electric vehicles (EVs) can be classified as Hybrid (HEV), Plug-in hybrid (PHEV), Battery electric vehicles (BEV) and Fuel Cell Electric Vehicle (FCEV). HEVs combine an internal combustion engine (ICE) with an electric motor and their batteries are charged using regenerative braking technology which converts kinetic energy to electrical energy. PHEVs are similar to HEVs but their batteries can also be charged using power from an electrical outlet. BEVs do not have a gasoline engine, they are equipped with an electric motor that is operated using the power stored in on-board batteries and are recharged from an electrical outlet. FCEVs also have an electric motor which is powered by electricity generated by combining the hydrogen stored in the on-board tank with the oxygen in the air.

Although BEVs and FCEVs have zero tail-pipe emissions, they do contribute to global emissions. These emissions levels are dependent on the energy sources used to produce the electricity used to charge the BEVs or to produce the hydrogen fuel for the FCEVs. The limited range of EVs (in electric mode) has been a disadvantage that has curtailed the widespread adoption of these vehicles.

Another obstacle negatively impacting the rate of adoption of EVs has been the charging times. Level 1 (home charging) uses a 120V 15 Amp electrical outlet and can add a 40 mile range with an eight-hour overnight charge. Level 2 (home and public charging) is based on a 240V 30 Amp circuit which can add up to 180 miles with an eight-hour overnight charge. DC Fast Charging (public charging) is the fastest recharging method currently available and can typically add 50 to 90 miles in 30 minutes.

Public charging stations require substantial infrastructure development to make their use a viable option. It is clear that the above charging solutions will increase the load on the national electric grid, which might necessitate additional infrastructure, both in electricity production as well as distribution network, particularly during peak use hours.

Battery costs are another area of concern for EV adoption. Most EVs currently are outfitted with Lithium Ion (Li-ion) batteries. Although there have been dramatic reductions in the cost ($/Kwh) of Li-ion batteries over the past decade, Li-ion batteries still represents a fair share of the total cost of the EV. Furthermore, the mining and production practices of Cobalt, which is an indispensable material in the production of Li-ion batteries, have come under increasing scrutiny by the international community over the past few years.

SUMMARY

A device is disclosed, which includes: a charge portion with a plurality of piezoelectric elements embedded in a tire configured for a vehicle, a capacitor mechanically coupled to the tire and electrically coupled to the plurality of piezoelectric elements; a transmitter coil, mechanically coupled to the tire and electrically coupled to the capacitor through a discharge portion; wherein in response to an external radial pressure on the tire resulting from movement of the vehicle which causes a pressure on the plurality of piezoelectric elements, the plurality of piezoelectric elements produce an electrical charge on the capacitor, and wherein the discharge portion electrically connects the electrical charge on the capacitor to the transmitter coil to send electromagnetic power to the vehicle.

A method is disclosed which includes: providing alternating charge portions and discharge portions around a circumference of a tire configured for a vehicle; electrically charging a capacitive storage layer in the tire with piezoelectric elements in the charge portions when each charge portion is under compression as the tire rotates causing a pressure on the piezoelectric elements; and discharging the capacitive storage layer to a transmitter coil with the discharge portions to transmit power to a receiver coil on the vehicle, wherein the transmitter coil is mechanically coupled to the tire and electrically coupled to the capacitor through the discharge portion.

A system for electromagnetic coupled powering of an electric vehicle is disclosed which includes: a plurality of charge portions and discharge portions embedded in and sequentially arranged around a circumference of a tire configured for a vehicle, wherein the plurality of charge portions include a plurality of element modules each with at least one piezoelectric element, a rectifier and a resistor; a capacitor embedded in the tire and electrically coupled to the plurality of piezoelectric elements, wherein the piezoelectric elements are configured to generate, in response to time variance over time of a compressive force on the piezoelectric element, a corresponding time-varying voltage difference between a top surface of the piezoelectric element and a bottom surface of the piezoelectric element, which induces a corresponding charging current to the capacitor; a transmitter coil embedded in the tire and electrically coupled to the capacitor through a discharge portion, wherein the discharge portion acts as pressure switch to discharge the capacitor in a time varying capacitor discharge current voltage through the transmitter coil, and the transmitter coil is configured to establish, in response to the time varying discharge current through the coil, a time varying magnetic field around the transmitter coil; wherein in response to an external radial pressure on the tire resulting from movement of the vehicle which causes a pressure on the plurality of piezoelectric elements, the plurality of piezoelectric elements produce an electrical charge on the capacitor, wherein the capacitor is a capacitor storage layer which includes a first plate and a second plate that is spaced from the first plate, the transmitter coil includes a conductor, the conductor having a conductor first end, a conductor second end, and a portion forming a loop, the loop having a first winding axis, the winding axis being colinear with a center axis of the tire, the conductor first end is electrically coupled to the first plate and the conductor second end is coupled to the second plate, and wherein the discharge portion electrically connects the electrical charge on the capacitor to the transmitter coil to send electromagnetic power to a receive coil on the vehicle, wherein the receiver coil is supported on the vehicle by a receiver coil support that is configured to align the receiver coil with the transmitter coil, and the receiver coil support is further configured to position the receiver coil relative to the transmitter coil such that, in response to the time varying magnetic field around the transmitter coil a time varying receiver coil current is induced through the receiver coil.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The figures depict one or more implementations in accord with the present teachings, by way of example only, not by way of limitation. In the figures, like reference numerals refer to the same or similar elements.

DETAILED DESCRIPTION

Figure 1:
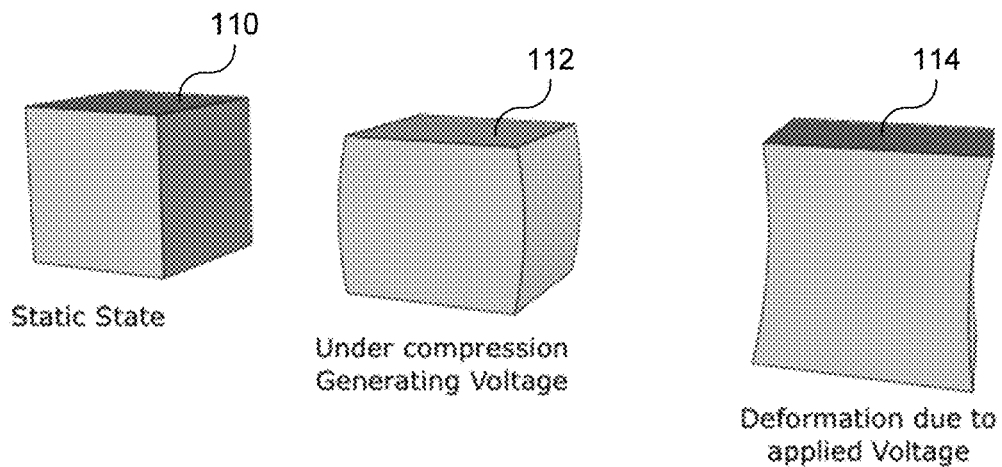
FIG. 1 is the depiction of the piezoelectric material geometry in a static neutral state as well as while generating a voltage under compression and while deforming when exposed to an electric potential.

In the following detailed description, numerous specific details are set forth by way of examples to provide a thorough understanding of the relevant teachings. However, it should be apparent that the present subject matter may be practiced without such details. In other instances, well-known methods, procedures, components, and/or circuitry are described at a relatively high-level, without detail, to avoid unnecessarily obscuring aspects of the disclosed subject matter.

REFERENCE SIGNS LIST

SI units
Internal combustion engine (ICE)
Hybrid electric vehicle (HEV)
Plug-in hybrid electric vehicle (PHEV)
Battery electric vehicle/All electric vehicle (BEV)
Fuel cell electric vehicle (FCEV)
Zero emission vehicle (ZEV)
System on Chip computer (SoC)
Single board computer (SBC)
Greenhouse gases (GHG)

| Selected electrical measurement definitions | | |
|---|---|---|
| Quantity | Name/Units | Definition |
| frequency f | hertz (Hz) | $1/s$ |
| force F | newton (N) | $kg \cdot m/s^2$ |
| pressure p | pascal (Pa) = $N/m^2$ | $kg/m \cdot s^2$ |
| energy E | work joule (J) = $N \cdot m$ | $kg \cdot m^2/s^2$ |
| power P | watt (W) = $J/s$ | $kg \cdot m^2/s^3$ |
| electric charge Q | coulomb (C) = $A \cdot s$ | $A \cdot s$ |
| voltage V | volt (V) = $W/A$ | $kg \cdot m^2/A \cdot s^3$ |
| current I | ampere (A) = $Q/s$ | $A$ |
| capacitance C | farad (F) | $A^2 \cdot s^4/kg \cdot m^2$ |
| resistance R | ohm ($\Omega$) | $kg \cdot m^2/A^2 \cdot s^3$ |
| flux density B | tesla (T) | $V \cdot s/m^2, kg/A \cdot s^2$ |

Implementations provide a self-contained method for power production for electric vehicles (EVs). This, self-charging system will enable the perpetual generation of electrical power to charge vehicle batteries while the vehicle is in motion. Without the need for external sources of power, the system can increase driving range, reduce the cost of EVs as well as the operating costs, reduce greenhouse gas emissions, reduce/eliminate time and infrastructure required for charging, reduce strain on the electrical grid, reduce reliance on fossil fuels and usher in the advent of a true zero emission EV.

Implementations use the normal force of gravity exerted on the contact patch of the tire to compress piezoelectric material which, in turn, converts that force into an electric voltage. The voltage generated is a function of the geometry of the piezoelectric material and the force applied to it. The generated voltage can be used to charge a capacitor through a conductor. Once the capacitor is charged and the tire has traversed far enough so that the piezoelectric material is no longer under compression, a discharge portion will discharge the accumulated voltage of the capacitor through the conductor causing the piezoelectric material to undergo a deformation while it absorbs (dissipates) the voltage. The conductor consists of multiple conducting circular current loops (transmitting coil). Once the capacitor discharges through the transmitter coil it will generate a varying magnetic field since the current in the transmitter coil varies exponentially with respect to time. This generated magnetic field can produce an induced Emf in a second coil comprised of multiple conducting circular current loops (receiver coil) in close proximity of the transmitter coil. The generated voltage (Emf) in the receiver coil can then be supplied to the Electric Vehicle through electrical conditioning circuitry.

This conditioning circuitry is well known to persons familiar with the art and is outside the scope of this description. The conditioned power output can be used for charging the batteries on-board the Electric Vehicle and/or directly operating the Electric Vehicle.

Implementations make it possible to reduce the size of an EV's on-board battery. This will result in a net weight reduction of the EV and generate cost savings from the smaller batter size. Furthermore, the Li-ion battery can be replaced and/or deployed alongside other less expensive battery technologies such as (but not limited to) Nickel Cadmium (NiCd) and Nickel-Metal Hydride (NiMH). Implementations also effectively increase the driving range of the EV since it will be possible to recharge the battery while the EV is in motion.

Implementations may reduce or eliminate the time required to charge the EV as well as the expense of charging infrastructure, private or public, and the cost of electricity used to charge the EV. It will also reduce or eliminate any additional demand on the national electric grid and distribution network. Perhaps most importantly, implementations can reduce greenhouse gas emissions (GHG) including CO2. Any excess power generated can be used to compensate for losses in the electrical conditioning circuitry and/or maintain battery temperature for peak performance (heating or cooling). Other potential uses of the excess power include (1) active carbon capture using CO2 capture technologies such adsorption, (2) distributed computing using multiple low cost, low powered System on Chip (SoC), Single board computer (SBC) in conjunction with high speed wireless data networks.

The examples set forth below are for BEVs although they can be applied to practically any type of wheeled EV, including but not limited to, HEVs, PHEVs, e-buses, light, medium and heavy commercial vehicles, eScooters, electric powered motorcycles, etc.

FIG. 1 is the depiction of a piezoelectric material geometry 100 in various states according to the piezo effect. In a static neutral state 110, the piezoelectric material has no electric or mechanical force applied. In a compressed state 112, the piezoelectric material has a mechanical force applied to it, causing the piezoelectric material to generate a voltage. When exposed to an electric potential, the piezoelectric material enters a physically deformed state 114.

The Piezo effect is the ability of certain materials to generate an electrical charge (polarization of the material) in response to a mechanical force exerted on them. Additionally, these materials undergo a controlled deformation when exposed to an electric field known as the inverse piezo effect. The aforementioned forces include compression and tension among others. Lead zirconate titanate ceramics is one such material. The performance characteristics and classifications of these materials are described in MIL-STD-1376B (Navy Type piezoelectric material). While any piezoelectric material can be used, materials exhibiting a combination of higher mechanical quality factor and Young's Modulus, lower electrical resistance and dielectric losses are desirable. Hard PZT, Navy type I and Navy type III, are suitable materials which meet the requirements.

In the piezo effect, the electrical charge produced by the material is proportional to the applied force and the geometry of the piezoelectric material. For a rod the voltage and displacement (change in dimensions) of the piezoelectric material is given by:

$$StaticVolatge_{rod} = g_{33} \times F_3 \times \frac{height}{Area}$$

where $g_{33}$ = Voltage constant $$StaticDisplacement_{rod} = \Delta height = d_{33}V$$

where $d_{33}$ = Charge constant

Research in the development of lead free piezoelectric materials has been on going for more than a decade. NBT, sodium bismuth titanate; KNN, potassium sodium niobate; BF, bismuth ferrite; and BT barium titanate are new classes of materials that are result of the research. These newly developed materials have yet to displace lead zirconate titanate's (PZT) market dominance. The piezoelectric material response to compression and subsequent decompression can be closely approximated by a triangular wave form with a positive and negative portion which can be rectified using a full wave rectifier circuit to generate a DC voltage. It can be shown that the average voltage of triangular wave form is equal to ½ of the peak voltage.

Figure 2A:
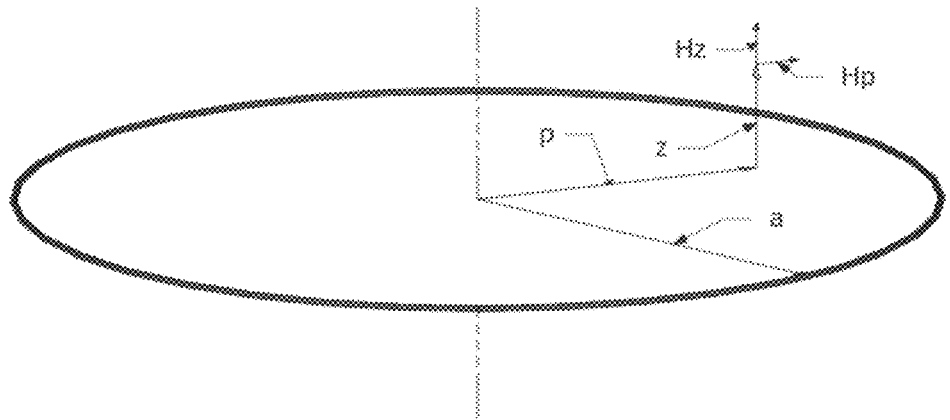
FIG. 2A shows the axial and radial components of the magnetic field of a circular current loop at a point at a distance z away in the axial direction and a distance p away in the radial direction.
Figure 2B:
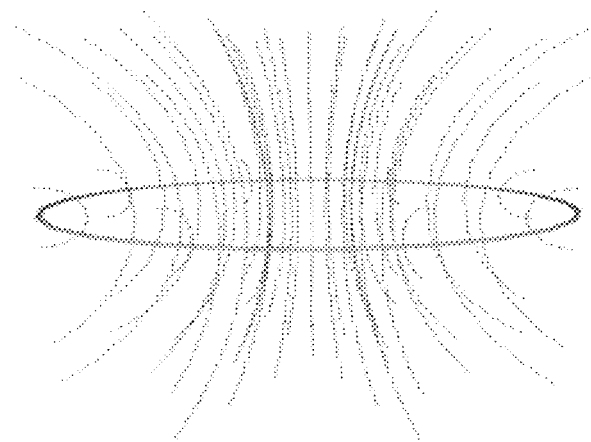
FIG. 2B shows magnetic lines representing the magnetic field produced by a current through a conductor loop.

FIG. 2A shows the axial and radial components of the magnetic field of a circular current loop at a point at a distance z away in the axial direction and a distance p away in the radial direction. FIG. 2B shows magnetic lines representing the magnetic field produced by a current through a conductor loop.

Electric currents and magnetic fields. Biot-Savart Law and the more generalized Ampere's Law relate magnetic fields to the currents as their sources. The magnetic field in space around an electric current is proportional to the electric current which serves as its source, just as the electric field in space is proportional to the charge which serves as its source. Ampere's Law states that for any closed loop path, the sum of the length elements times the magnetic field in the direction of the length element is equal to the permeability times the electric current enclosed in the loop.

Figure 3A:
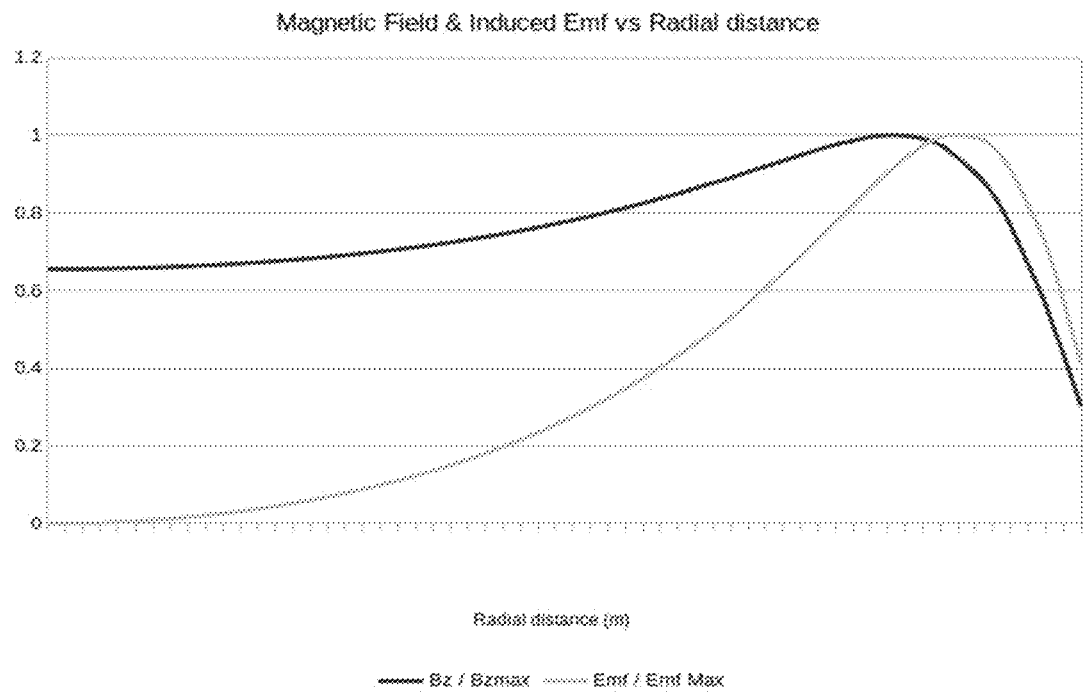
FIG. 3A is the plot of the magnet field and induced Emf as a function of radial distance away from the center of a circular current loop.

FIG. 3A is the plot of the magnet field and induced Emf (example 1 EV-A) as a function of radial distance away from the center of a circular current loop. The plot reveals that magnetic field reaches its maximum value as the distance from the center increases and a sharp decline as the radial distance gets larger than the radius of the circular current loop.

Magnetic field of a circular current loop The Axial (Bz) and Radial (Bp) components of the magnetic field at any point in space, outside the conductor, generated by a circular current loop can be calculated using the generalized formula:

$$B_p = \frac{\mu_0 I}{2\pi} \frac{z}{p\sqrt{((a+p)^2 + z^2)}} \left[ -K(k) + \frac{a^2 + p^2 + z^2}{(a-p)^2 + z^2} E(k) \right]$$

$$B_z = \frac{\mu_0 I}{2\pi} \frac{1}{\sqrt{((a+p)^2 + z^2)}} \left[ K(k) + \frac{a^2 - p^2 - z^2}{(a-p)^2 + z^2} E(k) \right]$$

$$k^2 = \frac{4ap}{(a+p)^2 + z^2}$$

where
a=loop radius
z=axial distance
p=radial distance
I=current $\mu_0$=permeability of free space
K, E=elliptic integrals of the first and second kind
The magnetic field on the axis of the circular current loop a distance z away from the loop $$B_z = \frac{\mu_0 I a^2}{2(a^2 + z^2)^{3/2}}$$

It can be shown that the sum of the radial component is zero due to the symmetry of the geometry of the circular current loop. The magnitude of a magnetic field for a circular current loop at the center of the loop is given by:

$$B_0 = \frac{I \mu_0}{2a} (at\, z = 0)$$

The magnetic field of multiple circular current loops are additive therefore the magnetic field of N loops at the center of the loops is given by:

$$B_0 = N \frac{I \mu_0}{2a} (at\, z = 0)$$

Emf due to changing magnetic field. Faraday's Law of induction states that any change in the magnetic environment of a coil of wire will cause a voltage (Emf) to be "induced" in the coil. No matter how the change is produced, the voltage will be generated. The change could be produced by changing the magnetic field strength, moving a magnet toward or away from the coil, moving the coil into or out of the magnetic field, rotating the coil relative to the magnet field, etc. The induced Emf in a coil is equal to the negative of the rate of change of magnetic flux times the number of turns in the coil and is directly proportional to the time rate of change of magnetic flux through the coil.

$$Emf = -N \frac{d\Phi_B}{dt} \text{ where } \Phi_B = \int \vec{B} \cdot d\vec{A}$$

$$Emf = \varepsilon = -N \frac{d}{dt} BA\cos\Theta$$

where:
N=Number of Turns
$\Phi_B$=BA
B=external Magnetic Field
A=Area of coil
$\Theta$=the incident angle
Magnetic flux $\Phi$ is the product of the average normal component of the magnetic field and the area that it penetrates. Lenz's Law states that the polarity of the induced Emf is such that it tends to produce a current that will create a magnetic flux to oppose the change in magnetic flux through the coil. (FIG. 2a, 2b).

Figure 3B:
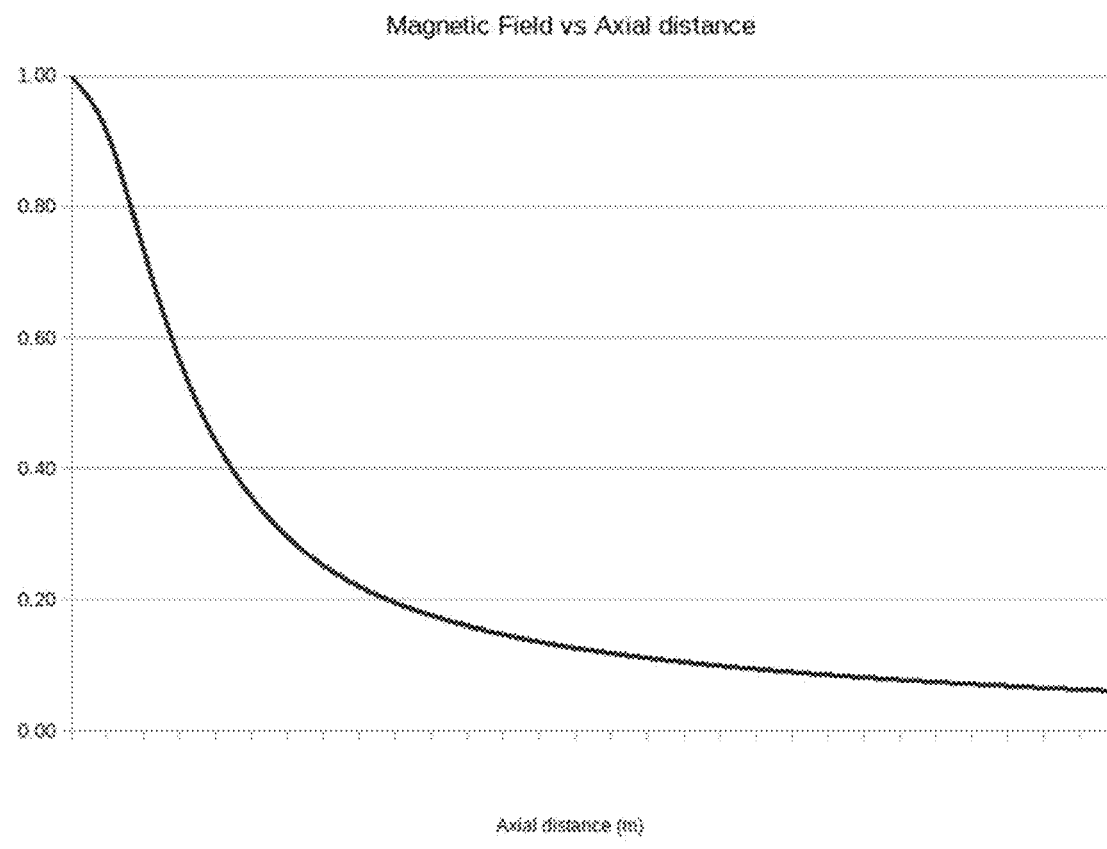
FIG. 3B is the plot of the magnetic field as a function of the axial distance away from the center of the circular current loop.

FIG. 3B is the plot of the magnetic field (example 1 EV-A) as a function of the axial distance away from the center of the circular current loop. The plot shows the decreasing magnetic field as the axial distance increases.

Exponentially decaying magnetic field. The Emf generated due to an exponentially decaying magnetic field can be calculated as follows:

$$Emf = -\frac{d\Phi_B}{dt} = -AB_{max}\frac{d}{dt}e^{-at} = aAB_{max}e^{-at}$$

for a=1/RC, where RC is the time constant, the Emf can be calculated using $$Emf = \frac{1}{RC} AB_{max} e^{\frac{-t}{RC}}$$

Mutual inductance and coupling factor. The mutual inductance between two coaxial filament current loops, one with radius r1 and another with radius r2, with the distance between centers x, can be calculated using Neumann's formula:

$$M = \frac{\mu_0}{4\pi} \int \int \frac{\vec{ds} \cdot (\vec{ds})'}{r}$$

which can be solved in the following form:

$$M_{12} = -\mu_0 \sqrt{r_1 r_2} \left[ \left( m - \frac{2}{m} \right) K(m) + \frac{2}{m} E(m) \right]$$

$$m = \frac{2\sqrt{r_1 r_2}}{\sqrt{(r_1 + r_2)^2 + x^2}}$$

where:
M=mutual inductance
r1, r2=radii of the two circular current loops
x=the distance between the centers of the circular current loops
K, E=elliptic integrals of the first and second kind
The coupling factor between two coils is defined by:

$$k_{coupling} = \frac{M}{L1 L2}$$

Where:
M=Mutual inductance
L1, L2=self-inductance of the two coils
Using the relations for self- and mutual-inductance, one can find that $0 < k_{coupling} < 1$.
The self-inductances L1 and L2 do not depend on the coil separation x, whereas the mutual inductance does.

Wheeler Approximation. Harold A. Wheeler developed formulas to give approximate inductances for various coil configurations. They are primarily based on empirical measurements, and they are accurate to a few percent.

For a multi-layer air core coil $$L = \frac{0.8(a^2 \times N^2)}{6a \times 9b \times 10c}$$

where:
a=average radius of windings
b=length of the coil
c=difference between the outer and inner radii of the coil.
N=number of Turns L=inductance in µH all dimensions in inches. applies to coils with rectangular cross section.

Current carrying capacity of a conductor. I. M. Onderdonk developed an equation while investigating conductor failure in high-voltage power transmission lines due to arcing (short circuit). His equation relates current, time and conductor size and assumes an adiabatic process. The equation can be used to ascertain the time required for a given temperature increase in the conductor due to joule heating.

$$33\left(\frac{I}{A}\right)^2 s = \log_{10}\left(\frac{\Delta T}{234 + T_a} + 1\right)$$

where:
I=current in amps
A=cross-section area in circular mils
s=the time in seconds the current is applied
ΔT=the rise in temp from ambient or initial state
Ta=the ref temp in deg C.

Figure 4:
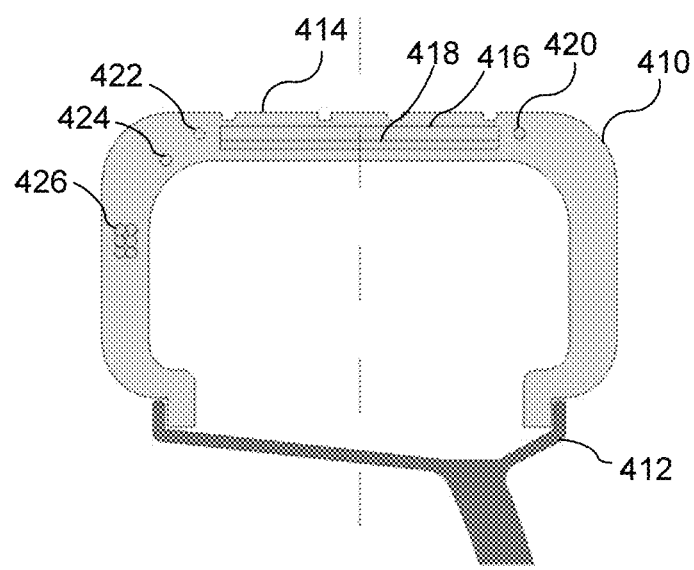
FIG. 4 shows a partial cross-section view of an example implementation of a tire mounted on a wheel for electromagnetic coupled powering and charging of an electric vehicle.

FIG. 4 shows a partial cross-section view of an example implementation of a tire 410 mounted on a wheel 412 for electromagnetic coupled powering and charging of an electric vehicle. The tire 410 includes a tread ply layer 414 around the circumference of the tire for contacting a road surface. Below the tread ply layer 414 is a charge/discharge layer 416. The charge/discharge layer 416 is divided into consecutive charge portions and discharge portions around the circumference of the tire as described with reference to FIG. 5 below. Below the charge/discharge layer 416 is a capacitive storage layer 418. The capacitive storage layer 418 may comprise one or more capacitors in one or more layers as described further below. The tire 410 further may include a number of embedded loop conductors or bus bars around the circumference of the tire to electrically connect the other elements of the tire. In the illustrated implementation in FIG. 4, the tire 410 includes a positive bus bar 420, a common bus bar 422 and a discharge bus bar 424. The tire 410 further includes a transmitter coil 426 around the circumference of the tire. In this implementation the transmitter coil 426 is located in a sidewall of the tire. The tire 410 may include other basic vehicle tire structures such as a liner ply, carcass ply, belt ply, wheel bead, etc. that are not explicitly shown in FIG. 4.

Figure 5:
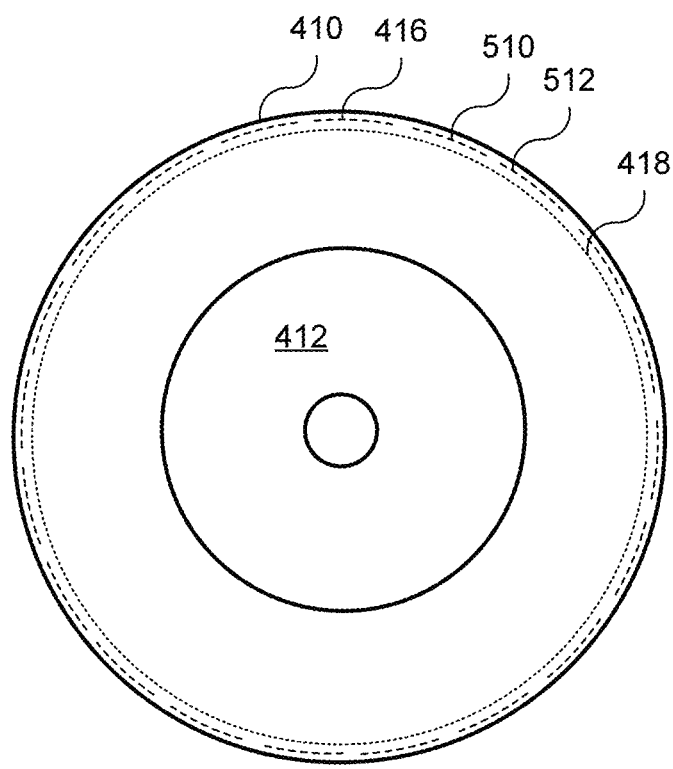
FIG. 5 shows a side view of an example implementation of a tire mounted on a wheel for electromagnetic coupled powering and charging of an electric vehicle.

FIG. 5 shows a side view of the example implementation of the tire 410 and wheel 412 for electromagnetic coupled charging of an electric vehicle introduced above. The charge/discharge layer 416 around the circumference of the tire 410 is divided into consecutive charge portions 510 and discharge portions 512. In the illustrated example implementation, there are 10 charge portions 510 and 10 discharge portions 512 alternating around the circumference of the tire 410. The length of the charge portions 510 and the discharge portions 512 are selected to be roughly equal to or relative to the length of the tire contact patch area which depends on the specific tire dimensions. The tire contact patch area is the area of the tire in contact with the supporting surface at any one time characterized by a patch length and a patch width. The number of charge portions 510 and discharge portions 512 may vary depending on the tire dimensions. The charge portion 510 is comprised of an array (m×n) of modules as described further below. The generated voltage from each charge portion is a function of the tire patch area, force on the tire patch area, size of the conducive pressure pads which ultimately exert force on the piezoelectric modules, number of array modules, number of piezoelectric elements per module as well as their height and area of the elements. When each charge portion 510 is in contact with the supporting surface it generates a charge to the capacitive storage layer 418 via the bus bars as described further below. As describe above each charge portion 510 is followed by a discharge portion 512. The discharge portion 512 discharges the electric charge placed on the capacitive storage layer 418 by the preceding charge portion 510. The discharge portion thus acts as a contact switch that closes the circuit between the capacitive storage layer and the transmitter coil 426 (FIG. 4) when the discharge portion comes under compression. The discharge portion 512 is described further below with reference to FIG. 8.

A capacitor is a passive two-terminal electrical device that is capable of storing energy in an electric field. A capacitor in its most basic form includes two conductors separated by an insulator generally referred to as a dielectric. A capacitor is characterized by a capacitance value (C) which is a function of the area of two parallel conductors and the separation distance between them (thickness of the dielectric material). The SI units for a capacitor is the Farad. Defined as the ratio of the positive or negative charge Q on each conductor to the voltage V between them. The energy stored on a capacitor can be calculated using $E_{cap}=\frac{1}{2}CV^2$ where C is the capacitance and V is the voltage. The energy stored on a capacitor can be discharged rapidly through a conductor. In a DC (Direct current) charging/discharging circuit the time constant is defined as T=RC where R is the resistance in the circuit and C is the capacitance. Capacitors charge and discharge exponential and it is generally accepted that they are fully (99%) charged or discharged within 5 time constants. The voltage of the capacitor in an RC circuit is governed by:

$V_{cap}=V_{source} \times (1-e^{-t/RC})$ during charging, and $V_{cap}=V_{source} \times e^{-t/RC}$ during discharge.

Plastic film capacitors can be broadly categorized into film/foil and metallized film capacitors. The basic structure of a film/foil capacitor consists of two metal foil electrodes and a plastic film dielectric between them. Metallized film capacitors are made of two metallized films with plastic film as the dielectric. The plastic film is coated with a thin layer of zinc or aluminum. Some of the most commonly used plastic film dielectrics include polyethylene naphthalate (PEN), polyethylene terephthalate (PET), and polypropylene (PP). Film/foil capacitors offer high insulation resistance, high pulse handling capability, excellent current carrying capability, and good capacitance stability.

Figure 6:
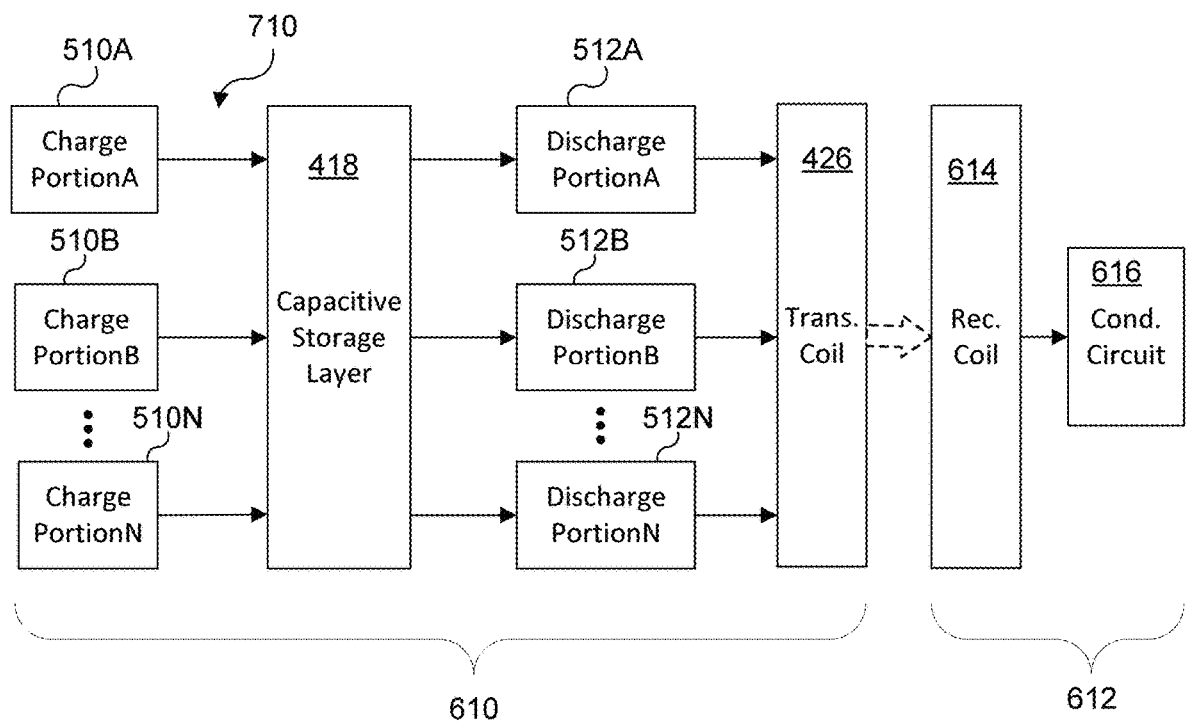
FIG. 6 is an electrical block diagram of an implementation.

FIG. 6 is an electrical block diagram of an implementation for electromagnetic coupled powering and charging of an electric car or vehicle. The electrical block diagram in FIG. 6 is divided into a tire circuit 610, residing in the tire, and a vehicle circuit 612, residing on or in the vehicle. The tire circuit 610 includes a number of charge portions 510 as described above. The charge portions shown in FIG. 6 include charge portionA 510A, charge portionB 510B and charge portion 510N, where N indicates a variable number of charge portions and discharge portions can be used depending on the specific implementation. The charge portions 510A through 510N are collectively referred to as charge portions 510. The charge portions 510 are each connected to the capacitive storage layer 418. The connections of the charge portions 510 to the capacitive storage layer are achieved by the positive bus bar and the common bus bar (not shown in FIG. 6) as described further below. The capacitive storage layer 418 is connected to each of the discharge portions 512A through 512N where again the discharge portions 512A through 512N are collectively referred to as discharge portions 512. The capacitive layer 418 is connected to the discharge portions 512 also using the positive bus bar and the common bus bar as described below. Thus both the charge portions 510 and the discharge portions 512 are connected to the capacitor via the positive bus bar. Each of the discharge portions 512 are connected to a transmitter coil 426 via a discharge bus bar and the common bus bar as described further below. The transmitter coil 426 produces an electromagnetic field to transmit power to the receiver coil 614 on the vehicle for powering and charging the vehicle as described herein.

Figure 10:
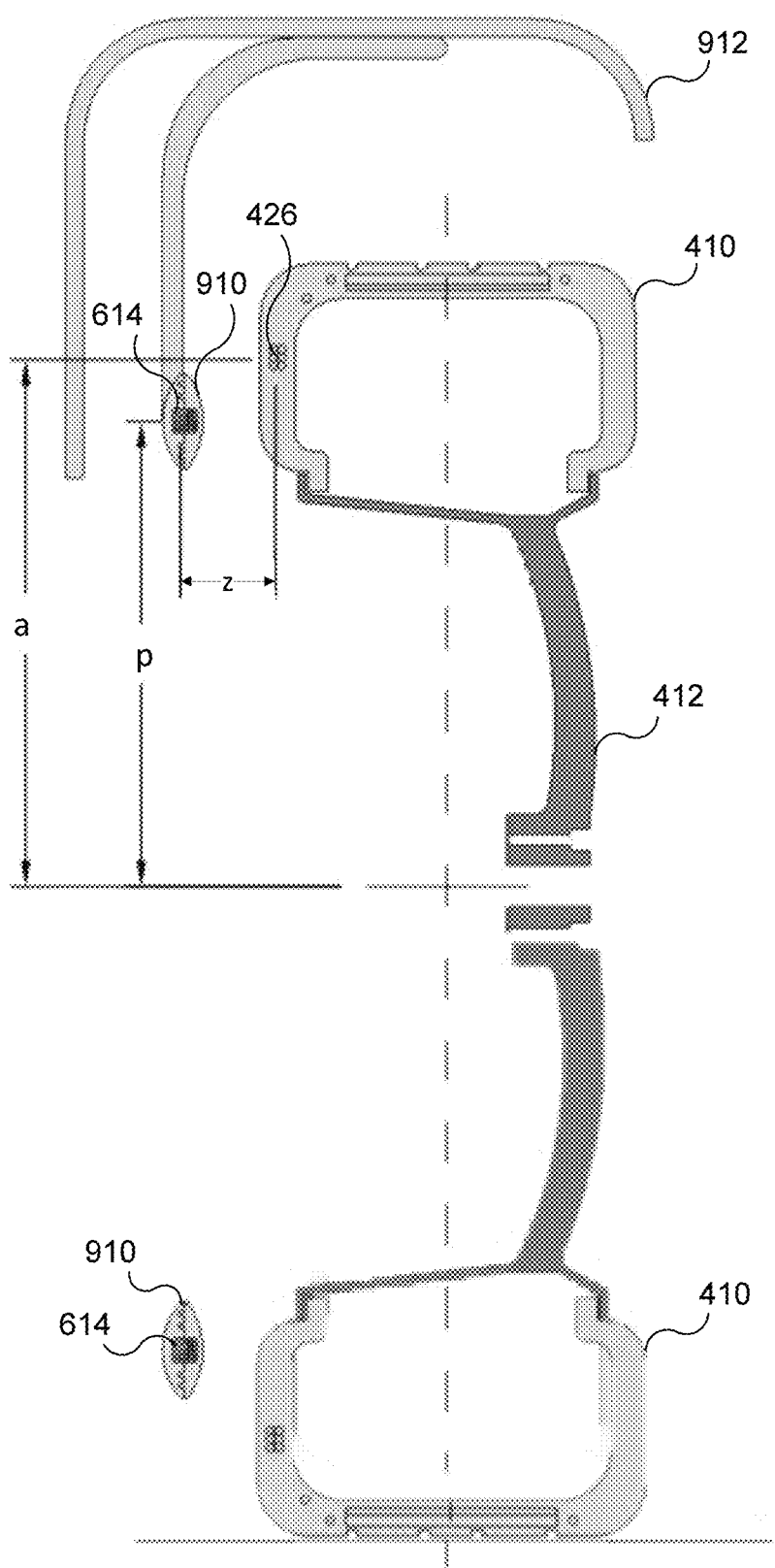
FIG. 10 is an illustration of the plan view of the tire which shows the dimensions for the transmitter and receiver coils.
Figure 11:
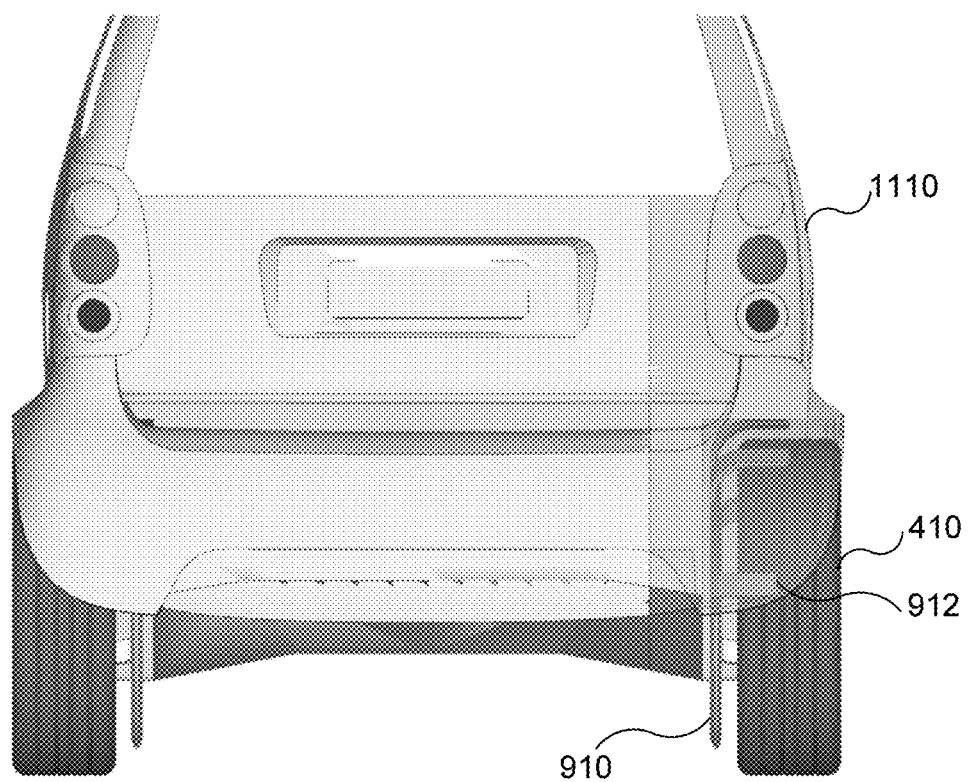
FIG. 11 is a view of a vehicle with a system as described herein.

Again referring to FIG. 6, the electrical block diagram further illustrates a vehicle circuit 612. The vehicle circuit 612 resides on or in the vehicle in a manner as shown in FIG. 11. The vehicle circuit includes a receiver coil 614. The receiver coil 614 preferably resides in close proximity of the transmitting coil as shown in FIGS. 10 and 11. The receiver coil 614 is placed on the vehicle located within the electromagnetic field of the transmitter coil 426 to receive power generated from the tire circuit 610. The receiver coil 614 is connected to a conditioning circuit 616 on the vehicle. The conditioning circuit 616 inputs the electrical power of the receiver coil 614 and provides it to the vehicle including charging circuitry (not shown) for charging the vehicle's batteries. The conditioning circuit 616 will vary depending on the specific vehicle implementation.

The transmitter coil 426 is preferably comprised of multiple tightly wound conductors characterized by $W_{Tx}$ windings and $L_{Tx}$ layers and $OD_{Tx}$ outer diameter and $WG_{Tx}$ conductor wire gauge embedded in the sidewall of the tire, on the brake side, with one terminal connected to the common bus bar 422 and the other to the discharge bus bar 424 (FIG. 4).

The receiver coil 614 is preferably comprised of multiple tightly wound conductors characterized by $W_{Rx}$ windings and $L_{Rx}$ layers and $OD_{Rx}$ outer diameter and $WG_{Rx}$ conductor wire gauge. The receiver coil 614 in enclosed in a receiver coil housing for protecting the receiver coil 614 from damage and preserving the geometrical stability of the coil. The receiver coil housing also provides anchor points for securing the receiver coil to the body, chassis or frame of the vehicle as described below. The receiver coil 614 presents two terminals to the power conditioning circuitry on the vehicle. Preferably the area of the transmitter coil 426 encompasses the area of the receiver coil 614. Also, the transmitter coil 426 and receiver coil 614 are preferably concentric, and have their respective circumscribed surfaces parallel to each other with the centers separated by an axial distance z away from each other (as shown in FIG. 10), preferably as close as practicable, and for this relative geometry between the coils to be maintained during operation of the vehicle.

Figure 7A:
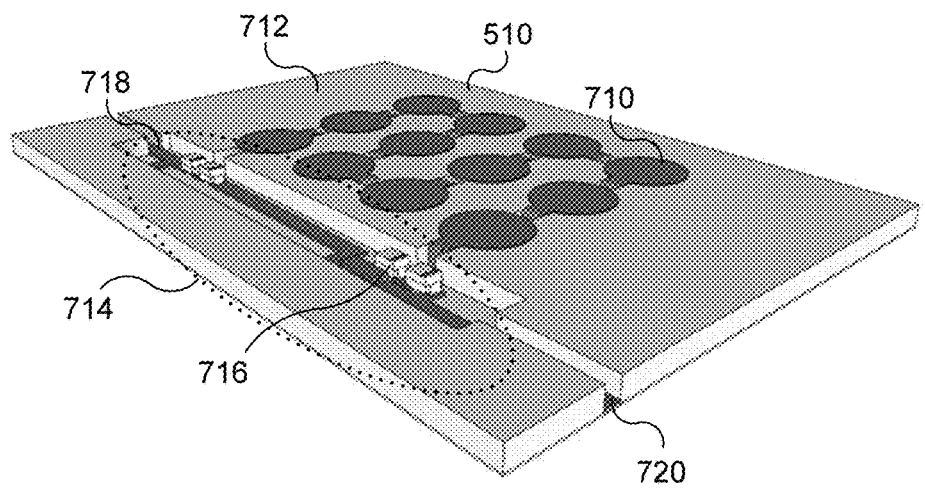
FIG. 7A depicts perspective view of charge portions of the charge/discharge layer.

FIG. 7A depicts top perspective view of a charge portion 510 of the charge/discharge layer 416 introduced above. The charge portion 510 may be comprised of an array (m×n) of charge modules 710 enclosed in a rubber housing 712. The array of modules in the example shown in FIG. 7 are shown connected in series. Other combinations of series and parallel modules could be used in the array. The charge portion 510 includes a rectifier section 714 which rectifies the electrical output of the charge modules 710. The rectifier section 714 preferably includes one or more diodes 716 and may also include a resister as described below with reference to FIG. 7C. The rectifier section 714 includes a common connection 718 to the common bus bar 422 and a positive connection 720 to the positive bus bar 420.

Figure 7B:
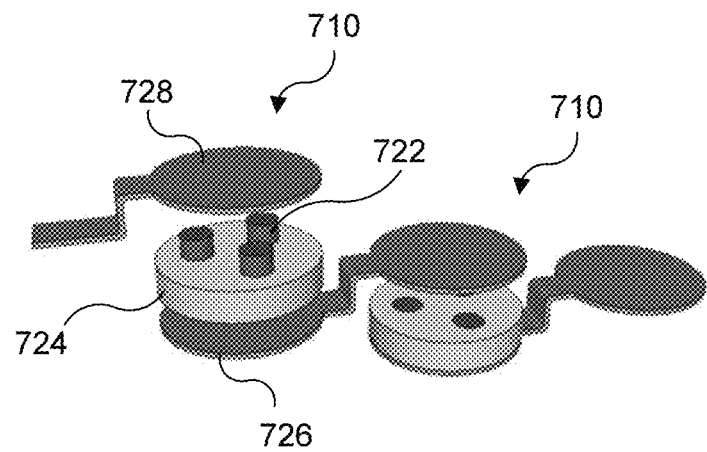
FIG. 7B illustrates an exploded view of two modules of a charge portion.
Figure 7C:
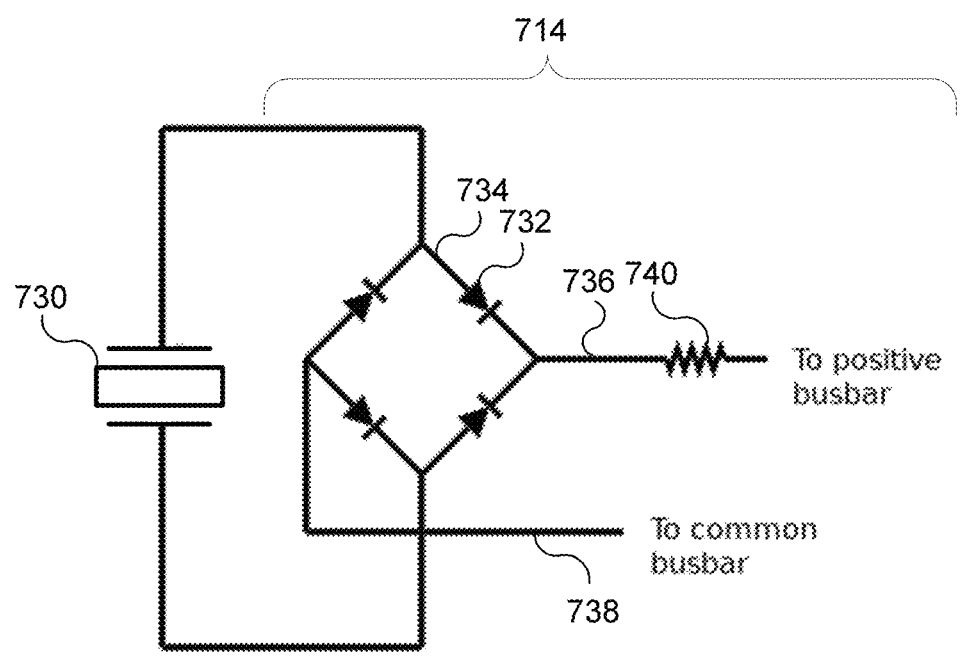
FIG. 7C shows an electrical diagram of a charge portions of the charge/discharge layer.

FIG. 7B illustrates an exploded view of two modules 710 of a charge portion 510. In this example, the charge modules 710 each contain three piezoelectric elements 722 encased in a module housing 724. Each charge module 710 has a top conductive pressure pad 728 and a bottom conductive pressure pad 726. The top conductive pressure pad 728 and the bottom conductive pressure pad 726 provide both a mechanical connection and an electrical connection to the piezoelectric elements. In this example, the bottom conductive pressure pad 726 is connected to or integrally formed with a top conductive pressure pad of an adjacent charge module. The module housing 724 is made of a lower durometer elastomer which will allow it to be compressed under pressure in order to permit compression of the piezoelectric elements 722 by the top and bottom conductive pressure pads while the tire patch is under compression. In addition, the module housing 724 will also act as support for the conductive pressure pads. The charge modules 710 are embedded in the tire below the tire tread and are compressed when the tire patch containing the charge portion containing the modules comes in contact with the pavement. The generated voltage from each charge portion is a function of the tire patch area, force on the tire patch area, size of the conductive pressure pads which ultimately exert force on the piezoelectric modules, number of array modules, number of piezoelectric elements per module as well as their height. Multiple piezoelectric elements are used for force distribution as well as reduction of the number of points of failure. The modules may be connected in series to increase the generated voltage for charging the capacitive storage layer. Each charge portion has two connections, one to the positive bus bar and one to the common bus bar.

FIG. 7C shows an electrical diagram of a charge portion 510 (FIG. 5) of the charge/discharge layer 416 (FIG. 4). As introduced above, each charge portion 510 includes a number of charge modules each containing a number of piezoelectric elements. The piezoelectric elements of all the charge modules for a charge portion 510 are combined and represented in FIG. 7C by piezoelectric element 730. Piezoelectric element 730 is connected to the rectifier section 714 as described above with reference to FIG. 7A. In this example, the rectifier section 714 includes four diodes 732 connected as a full wave rectifier 734. The positive terminal 736 of the full wave rectifier is connected to the positive bus bar 420 (FIG. 4) and the negative terminal 738 is connected to the common bus bar 422 (FIG. 4). The charge portion 510 may include a resistor 740 in the rectifier section 714 between the positive terminal 736 and the positive bus bar 420. The resistor 740 provides resistance for an RC time constant for charging the capacitive storage layer 418.

The capacitive storage layer 414 in the illustrated implementation consists of multiple film/foil/dielectric layers wound along the length (circumference) of the tire. The width of the film/foil/dielectric layers is preferably smaller than the contact patch width. The film/foil/dielectric layers and terminals are encapsulated in a rubber housing in the layers of the tire. The capacitive storage layer 414 has two connections, one to the positive bus bar and one to the common bus bar. The voltage rating of the capacitive storage layer is preferably about 50% or more higher than the peak voltage generated by the charging portion during normal operation in order to be able to cope with sudden voltage spikes that may occur due to uneven road surfaces.

Figure 8:
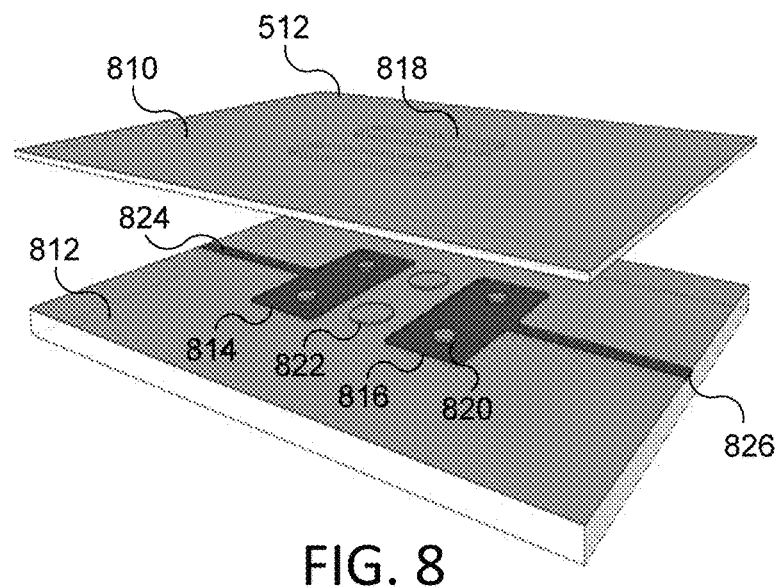
FIG. 8 depicts an exploded view of a charge portion of the charge/discharge layer.

FIG. 8 depicts an exploded view of a discharge portion 512 of the charge/discharge layer 416. The discharge portion 512 in the charge/discharge layer is embedded in the tire below the tire tread and is compressed when the tire patch comes in contact with the pavement. The discharge portion 512 acts as a switch that closes the circuit to connect the capacitive storage layer 418 to the transmitter coil 426 as described above with reference to FIG. 6. In the illustrate example, the discharge portion 512 includes a top layer 810 and a bottom layer 812. The bottom layer 812 of the discharge portion 512 includes two lower conductors 814, 816 that come in contact via one or more top conductors 818 in the top layer 810 when the discharge portion 512 comes under compression. The discharge portion 512 may include one or more spacers to keep the lower conductors 814, 816 apart from the top conductors 818 when the discharge portion 512 is not under compression. In this example, the discharge portion includes center spacers 822 and conductor spacers 820 within the outline of the lower conductors 814, 816. One conductor 814 is connected to the positive bus bar 420 via connector 824 and the other conductor 816 is connected to the discharge bus bar 424 (FIG. 4) via connector 826. The discharge portion 512 could include other configurations of contacts to provide a pressure sensitive switch to connect the capacitive storage layer 418 to the transmitter coil 426. For example, the discharge portion could include lower contacts with interleaved conductive fingers that are connected by the top conductors when the discharge portion comes under compression.

Figure 9:
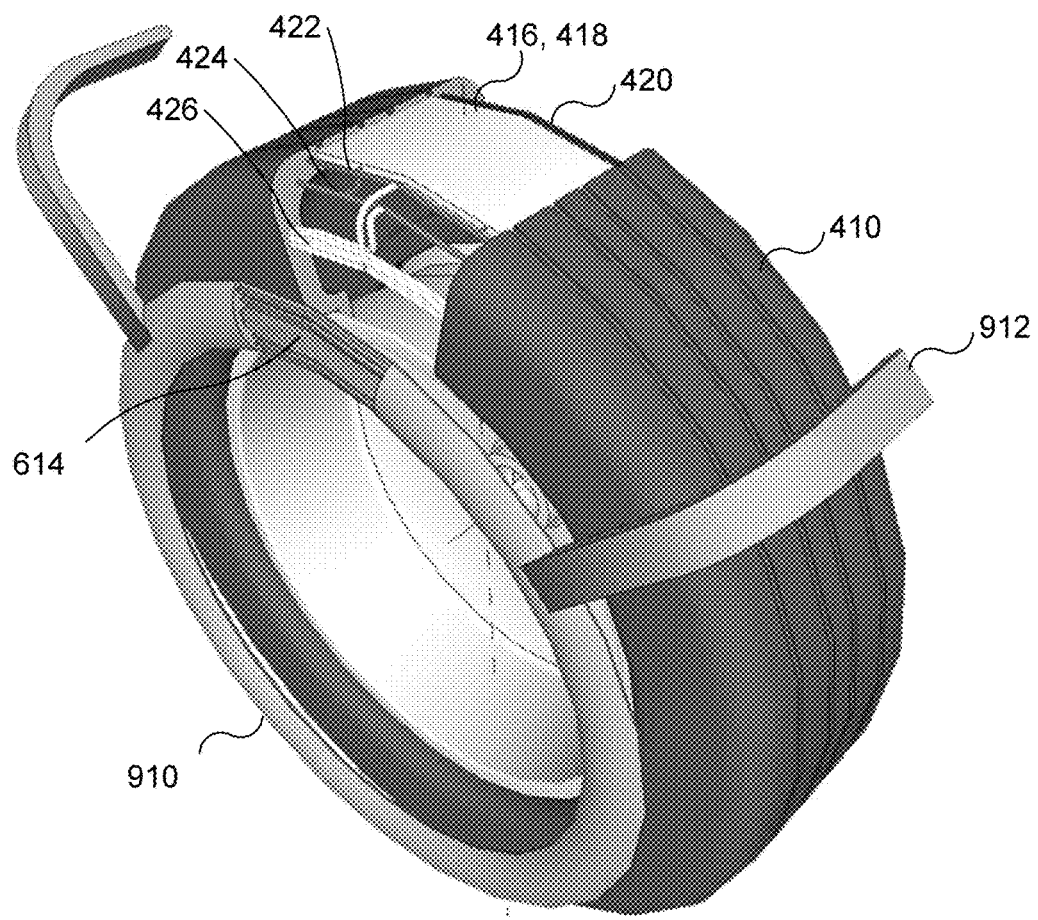
FIG. 9 is a three-dimensional perspective view of a tire assembly which shows the respective positions of the receiver and transmitter coils as well as the charge/discharge layer, capacitive storage layer and bus bars.

FIG. 9 is a three-dimensional view of a tire assembly for electromagnetic coupled powering and charging of an electric vehicle. FIG. 9 shows the respective positions of the transmitter coil 426 inside the tire 410, and receiver coil 614 located inside a receiver coil housing 910. The receiver coil housing 910 is attached to the vehicle with one or more chassis attachment arms 912. FIG. 9 further illustrates the positions of the charge/discharge layer 416, the positive bus bar 420, the discharge bus bar 424 and the common bus bar 422 in a cut away portion of the tire 410. The storage layer 418 (only partially visible) is below the charge/discharge layer 416.

FIG. 10 is an illustration of the plan view of the tire 410 on the wheel 412 to illustrate the dimensions for the transmitter coil 426 and the receiver coil 614. The transmitter coil 426 is located in the tire 410 as described above. The receiver coil 614 is located in the receiver coil housing 910. The horizontal distance between the transmitter coil 426 and the receiver coil 614 is represented by distance "z". The receiver coil 614 is located a vertical distance "p" from the center axis of the wheel 412 and the transmitter coil 426 is located a vertical distance "a" from the center axis of the wheel 412. The vertical separation distance of the receiver coil 614 and the transmitter coil 426 can be determined by subtracting distance "p" from distance "a".

FIG. 11 is a view of a vehicle 1110 with a system for electromagnetic coupled charging of an electric vehicle as described herein. A tire 410 includes the components described above including a transmitter coil (not shown). A receiver coil (not visible) is mounted inside the receiver coil housing 910 that is mounted to the vehicle 110 with several chassis attachment arms 912. One of ordinary skill in the art will recognize that other attachment arm configurations could be used to mount the receiver coil housing 910 to the vehicle 110.

Figure 12:
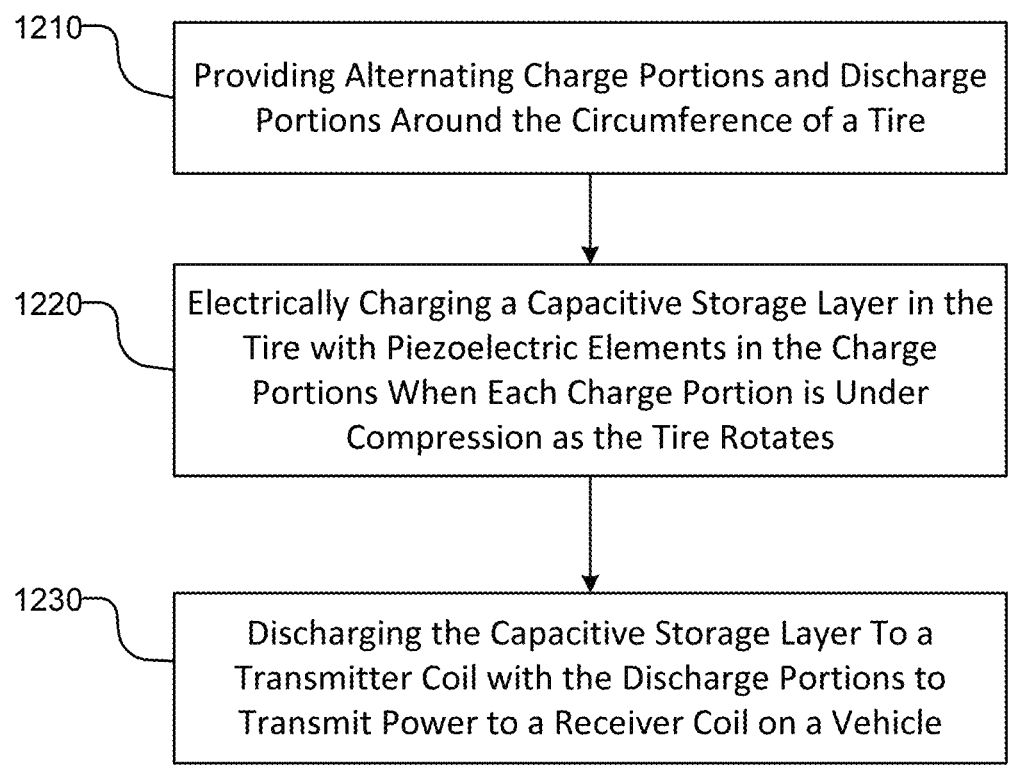
FIG. 12 is a flowchart of an implementation of a process for electromagnetic coupled powering and charging of an electric vehicle.

FIG. 12 is a flowchart of an implementation of a process for electromagnetic coupled powering and charging of an electric vehicle. The first step (1210) of an example implementation includes providing alternating charge portions and discharge portions around the circumference of a tire configured for a vehicle. The charge portion may include one or more element modules, each having at least one piezoelectric element in an element module housing. The modules may further include a lower conductive pressure pad on a top surface of the element module housing, an upper conductive pressure pad on a bottom surface of the element module housing, where the element module housing is a lower durometer material than the piezoelectric elements such that compression force applied to the tire causes the piezoelectric elements to produce the electrical charge on the capacitor. The discharge portion acts as pressure switch to discharge the capacitor in a time varying discharge current through the transmitter coil, and the transmitter coil is configured to establish, in response to the time varying discharge current through the coil, a time varying magnetic field around the transmitter coil to transmit power to the receiver coil located on the vehicle.

The second step (1220) of the implementation of FIG. 12 includes electrically charging a capacitive storage layer in the tire with piezoelectric elements in the charge portions when each charge portion is under compression as the tire rotates. The capacitor storage layer may include one or more capacitors. The capacitors of the capacitive storage layer may include a first plate and a second plate that is spaced from the first plate, the transmitter coil includes a conductor, the conductor having a conductor first end, a conductor second end, and a portion forming a loop, the loop having a first winding axis, the winding axis being colinear with a center axis of the tire, the conductor first end is electrically coupled to the first plate and the conductor second end is coupled to the second plate.

The final step (1230) of the implementation of FIG. 12 includes discharging the capacitive storage layer to a transmitter coil with the discharge portions to transmit power to a receiver coil on the vehicle. The process may further include a receiver coil being supported by the vehicle; wherein the receiver coil has a second winding axis, the receiver coil is supported on the vehicle by a receiver coil support that is configured to align the second winding axis colinear with the first winding axis, and the receiver coil support is further configured to position the receiver coil relative to the transmitter coil such that, in response to the time varying magnetic field around the transmitter coil a time varying receiver coil current is induced through the receiver coil. The process may further include the receiver coil connected to a conditioning circuit on the vehicle to supply power to the vehicle using the time varying receiver coil current and wherein the transmitting coil is embedded in the sidewall structure of the tire such that upon the tire being mounted to a wheel to form a wheel-tire combination, and the wheel-tire combination is mounted to the vehicle, and the winding axis is colinear with an axis of rotation of the wheel-tire combination.

Example 1—Electric Vehicle A (EV-A). In this first example, the curb weight of the vehicle is 1,085 kg. The weight of the vehicle exerts a force of approximately 2,927 N force on the tire patch area of each of the two rear wheels with a 45/55 front rear weight distribution. The OEM tires specified for the rear wheels of a vehicle in this class are P185/60R15 84T tires with a no-load outside diameter of 603 mm. The circumference of the tire is 1.89 m which at velocity of 2.78 m/s (roughly 10 km/h) will have gone through a full revolution in one second. EV-A has an average power requirement of 255 W/mi (158 W/km). At 40 km/h the average power requirement is approximately 6.3 kW.

In Example 1, the contact patch length of tire is 97 mm (length) which translates into 9 charge/discharge portions along the circumference of the tire. The voltage generation (charge portion) consists of any array of 12 modules, arranged in a 3×4 configuration, with each 15 mm diameter module housing having three (3) Navy type I piezoelectric elements, arranged in a concentric ring one half of the diameter of the module. The elements are preferably positioned angularly equidistant with a 2.7 mm outer diameter and 3 mm in height. The elements are interconnected in series with conducting electrical connections such as the conductive pressure pads described above. The charge portion is connected to the common and positive bus bars through a full wave rectifier and a 2 ohm resistor (R1). The storage layer, or capacitive storage layer, consists of a 220 microfarad capacitor rated at 2,000 Volts connected to the common and positive bus bars. The discharge potion consists of two conductors that make contact when the discharge portion comes under compression and complete the circuit between the positive and discharge bus bars. The transmitter coil (circular current loops of conducting magnet/enamel wire) consists of 2 windings by 3 layers 4 AWG enamel wire with outer diameter of 520 mm embedded in the sidewall of the tire. The length of the transmitter coil is 9.8 meters and the weight is 1.84 kg. The transmitter coil is connected to the discharge and common bus bars which allows the capacitive storage layer to discharge through the transmitter coil (in series with a 2 ohm bleed resistor (R2)) every time a discharge potion comes under compression.

Again referring to Example 1, the receiver coil consists of a 6 winding by 6 layers 10 AWG enamel wire with and outer diameter of 460 mm. The length of the transmitter coil is 52 meters and the weight is 2.43 kg. The coupling factor between the transmitter and receiver coils is 0.44 using the Wheeler approximation. The receiver coil must be positioned in close proximity to the transmitter coil, in this case, 50 mm axial distance with the circumscribed surfaces of the two coils parallel to each other. The axial component of the magnetic field (Bz) can be evaluated at any point in space using the formulas described above. Bzmax calculated at the center of the receiver coil (FIG. 10) is 8.89 E-03 Tesla which is an exponentially decaying field. This field will produce mean power ($P=I^2R$) of 717 Watts with a mean voltage of 24.76 volts DC and mean current of 11.23 Amps across a 2.2 ohm constant load. The combined power production from both rear wheel assemblies is approximately 1,434 Watts per rotation at speeds in excess of 10 kph. The power output will increase as a function of vehicle speed and tire rotations. As an example, with the current configuration, at 40 km/h (~25 mph) the total power output is 7.2 kW and at 90 km/h (~56 mph) the power output is approximately 18.6 kW.

Example 2—Electric Vehicle B (EV-B). The curb weight of the vehicle is 1,343 kg. The weight of the vehicle exerts a force of approximately 3,294 N force on the tire patch area of each of the two rear wheels with a 50/50 front rear weight distribution. The OEM tires specified for the rear wheels are P155/70R19 84Q tires with a no-load outside diameter of 696 mm. The circumference of the tire is 2.18 m which at velocity of 2.78 m/s (roughly 10 km/h) will have gone through a full revolution in one second. EV-B has an average power requirement of 260 Wh/mi (161 Wh/km). At 40 km/h the average power requirement is approximately 6.5 kW. The contact patch length of tire is 136 mm (length) which translates into 8 charge/discharge portions along the circumference of the tire. The voltage generation (charge portion) consists of any array of 12 modules, arranged in a 3×4 configuration, with each 15 mm diameter module housing three (3) Navy type I piezoelectric elements, arranged in a concentric ring one half of the diameter of the module with elements positioned angularly equidistant, elements 2.5 mm outer diameter and 3 mm height interconnected in series with conducting electrical connections such as the conductive pressure pads described above. The charge portion is connected to the common and positive bus bars through a full wave rectifier and a 2 ohm resistor (R1).

The capacitive storage layer consists of a 220 microfarad capacitor rated at 2,000 Volts and is also connected to the common and positive bus bars. The discharge potion consists of two conductors that make contact when the discharge portion comes under compression and complete the circuit between the positive and discharge bus bars. The transmitter coil (circular current loops of conducting magnet/enamel wire) consists of 2 windings by 3 layers 4 AWG enamel wire with outer diameter of 580 mm embedded in the sidewall of the tire. The length of the transmitter coil is 11 meters and weight is 2.1 kg. The transmitter coil is connected to the discharge and common bus bars which allows the capacitive storage layer to discharge through the transmitter coil (in series with a 2 ohm bleed resistor (R2)) every time a discharge potion comes under compression. The receiver coil consists of a 6 winding by 6 layers 10 AWG enamel wire with and outer diameter of 520 mm. The length of the transmitter coil is 58.8 meters and the weight is 2.75 kg. The coupling factor between the transmitter and receiver coils is 0.47 using the Wheeler approximation. The receiver coil must be positioned in close proximity to the transmitter coil, in this case, 50 mm axial distance with the circumscribed surfaces of the two coils parallel to each other. The axial component of the magnetic field (Bz) can be evaluated at any point in space using the formulas described above.

Bzmax calculated at the center of the receiver coil (FIG. 3) is 8.97 E-03 Tesla which is an exponentially decaying field. This field will produce mean power ($P=I^2R$) of 925 Watts with a mean voltage of 31.94 volts DC and mean current of 11.24 Amps across a 2.8 ohm constant load. The combined power production from both rear wheel assemblies is approximately 1,850 Watts per rotation at speeds in excess of 10 kph. The power output will increase as a function of vehicle speed and tire rotations. As an example, with the current configuration, at 40 km/h (~25 mph) the total power output is 9 kW and at 90 km/h (~56 mph) the power output is approximately 20 kW.

Example 3—Electric Vehicle C (EV-C). The curb weight of the vehicle is 2,208 kg. The weight of the vehicle exerts a force of approximately 5,321 N force on the tire patch area of each of the two rear wheels with a 50/50 front rear weight distribution. The OEM tires specified for the rear wheels are P235/65R18 106V tires with a no-load outside diameter of 758 mm. The circumference of the tire is 2.38 m which at velocity of 2.78 m/s (roughly 10 km/h) will have gone through a full revolution in one second. EV-C has an average power requirement of 360 Wh/mi (224 Wh/km). At 40 km/h the average power requirement is approximately 9.3 kW. The contact patch length of tire is 167 mm (length) which translates into 7 charge/discharge portions along the circumference of the tire. The voltage generation (charge portion) consists of any array of 12 modules, arranged in a 3×4 configuration, with each 15 mm diameter module housing three (3) Navy type I piezoelectric elements, arranged in a concentric ring one half of the diameter of the module with elements positioned angularly equidistant, elements 2.3 mm outer diameter and 3 mm height interconnected in series with conducting with conducting electrical connections such as the conductive pressure pads described above. The charge portion is connected to the common and positive bus bars through a full wave rectifier and a 2 ohm resistor (R1).

The capacitive storage layer consists of a 270 microfarad capacitor rated at 2,000 Volts and is also connected to the common and positive bus bars. The discharge potion consists of two conductors that make contact when the discharge portion comes under compression and complete the circuit between the positive and discharge bus bars. The transmitter coil (circular current loops of conducting magnet/enamel wire) consists of 2 windings by 3 layers 4 AWG enamel wire with outer diameter of 620 mm embedded in the sidewall of the tire. The length of the transmitter coil is 11.7 meters and the weight is 2.2 kg.

The transmitter coil is connected to the discharge and common bus bars which allows the capacitive storage layer to discharge through the transmitter coil (in series with a 2 ohm bleed resistor (R2)) every time a discharge potion comes under compression. The receiver coil consists of a 6 winding by 7 layers 10 AWG enamel wire with and outer diameter of 560 mm. The length of the transmitter coil is 73.9 meters and the weight is 3.46 kg. The coupling factor between the transmitter and receiver coils is 0.49 using the Wheeler approximation. The receiver coil must be positioned in close proximity of the transmitter coil, in this case, 50 mm axial distance with the circumscribed surfaces of the two coils parallel to each other. The axial component of the magnetic field (Bz) can be evaluated at any point in space using the formulas described above.

Bzmax calculated at the center of the receiver coil (FIG. 3) is 8.66 E-03 Tesla which is an exponentially decaying field. This field will produce mean power ($P=I^2R$) of 984 Watts with a mean voltage of 33.95 volts DC and mean current of 11.24 Amps across a 3.2 ohm constant load. The combined power production from both rear wheel assemblies is approximately 1,969 Watts per rotation at speeds in excess of 10 kph. The power output will increase as a function of vehicle speed and tire rotations. As an example, with the current configuration, at 40 km/h (~25 mph) the total power output is 7.8 kW and at 90 km/h (~56 mph) the power output is approximately 19.6 kW.

The coils in the above examples are simple circular tightly wound coils with a square and/or rectangular cross section, while coils with other cross-sectional shapes may also be used. The receiver coil needs to be affixed rigidly to the vehicle such that there is virtually no displacement since the axial distance and/or angular deviation can adversely affect the power output of receiver coil. The sidewalls of the tires need to be reinforced, similar to that of run-flat tires, in order to reduce stresses on the transmitter coil, help maintain the coil geometry, and also protect the transmitter coil against deformation in case of tire pressure loss.

It should be noted that tuning of the parameters such as (i) the receiver coil configuration (layers and windings), (ii) receiver coil outer diameter, (iii) capacitor size (capacitance), (iv) adjustment of separation distance between the transmitter and receiver coils, (v) transmitter voltage generation and coil outer diameter, etc. can be tailored to produce the desired power output.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification, including in the summary points that follow, are approximate, not exact. They are intended to have a reasonable range that is consistent with the functions to which they relate and with what is customary in the art to which they pertain.

Language is intended and should be interpreted to be as broad as is consistent with the ordinary meaning of the language is used in the context of this disclosure, and to encompass all structural and functional equivalents.

Except as stated immediately above, nothing that is stated or illustrated is intended or should be interpreted to cause dedication of any component, step, feature, object, benefit, advantage, or equivalent to the public.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

In the foregoing Detailed Description, it can be seen that various features are grouped together in various examples for the purpose of streamlining the disclosure. This method of disclosure is not to be interpreted as reflecting an intention that any summary point requires more features than it expressly recites.

What is claimed is:

1. A device, comprising:
    a plurality of charge portions each with a plurality of piezoelectric elements embedded in a tire configured for a vehicle,
    a capacitor mechanically coupled to the tire and electrically coupled to the plurality of piezoelectric elements;
    a transmitter coil, mechanically coupled to the tire and electrically coupled to the capacitor through a plurality of discharge portions;
    wherein in response to an external radial pressure on the tire resulting from movement of the vehicle which causes a pressure on the plurality of piezoelectric elements, the plurality of piezoelectric elements produce an electrical charge on the capacitor, and
    wherein the plurality of discharge portions electrically connect the electrical charge on the capacitor to the transmitter coil to send electromagnetic power from the tire to the vehicle to power to the vehicle.

2. The device according to claim 1, wherein the piezoelectric element is configured to generate, in response to time variance over time of a compressive force on the piezoelectric element, a corresponding time-varying voltage difference between a top surface of the piezoelectric element and a bottom surface of the piezoelectric element, which induces a corresponding charging current to the capacitor.

3. The device according to claim 1, wherein the plurality of charge portions and discharge portions alternate consecutively around a circumference of the tire in a charge/discharge layer below a tread ply layer of the tire.

4. The device according to claim 3, wherein the plurality of charge portions include at least one element module, a rectifier and a resistor.

5. The device according to claim 4, wherein the at least one element module comprises:
- at least one piezoelectric element of the plurality of piezoelectric elements;
- an element module housing to mechanically support the at least one piezoelectric element;
- a bottom conductive pressure pad on a bottom surface of the element module housing;
- a top conductive pressure pad on a top surface of the element module housing, and
- wherein the element module housing is a lower durometer material than the piezoelectric elements such that compression force applied to the tire causes the piezoelectric elements to produce the electrical charge on the capacitor.

6. The device according to claim 1 wherein the discharge portion acts as pressure switch to discharge the capacitor in a time varying capacitor discharge current through the transmitter coil, and the transmitter coil is configured to establish, in response to the time varying discharge current through the coil, a time varying magnetic field around the transmitter coil to transmit power to a receiver coil located on the vehicle.

7. The device according to claim 1, wherein the capacitor is a capacitor storage layer extending around the circumference of the tire which includes a first plate and a second plate that is spaced from the first plate, the transmitter coil includes a conductor, the conductor having a conductor first end, a conductor second end, and a portion forming a loop in a sidewall around a circumference of the tire, the loop having a first winding axis, the winding axis being colinear with a center axis of the tire, the conductor first end is electrically coupled to the first plate and the conductor second end is coupled to the second plate.

8. The device according to claim 1, wherein the transmitter coil has a first winding axis, and wherein the system further comprises:
- a receiver coil being supported by the vehicle;
- wherein the receiver coil has a second winding axis, the receiver coil is supported on the vehicle by a receiver coil support that is configured to align the second winding axis colinear with the first winding axis, and the receiver coil support is further configured to position the receiver coil relative to the transmitter coil such that, in response to a time varying magnetic field around the transmitter coil a time varying receiver coil current is induced through the receiver coil.

9. The device according to claim 8, wherein the receiver coil is connected to a conditioning circuit on the vehicle to supply power to the vehicle using the time varying receiver coil current.

10. The device according to claim 1, wherein the transmitter coil is embedded in a sidewall structure of the tire such that upon the tire being mounted to a wheel to form a wheel-tire combination, and the wheel-tire combination is mounted to the vehicle.

11. A method comprising:
- providing a plurality of charge portions and a plurality of discharge portions alternating around a circumference of a tire configured for a vehicle;
- electrically charging a capacitive storage layer in the tire with piezoelectric elements in the plurality of charge portions when each charge portion is under compression as the tire rotates causing a pressure on the piezoelectric elements;
- discharging the capacitive storage layer to a transmitter coil with the plurality of discharge portions to transmit power to a receiver coil on the vehicle, wherein the transmitter coil is mechanically coupled to the tire and electrically coupled to the capacitor through the plurality of discharge portions. and
- sending electromagnetic power from the tire to the vehicle to power to the vehicle.

12. The method according to claim 11 wherein the piezoelectric elements are configured to generate, in response to time variance over time of a compressive force on the piezoelectric element, a corresponding time-varying voltage difference between a top surface of the piezoelectric element and a bottom surface of the piezoelectric element, which induces a corresponding charging current to the capacitive storage layer.

13. The method according to claim 11, wherein the plurality of charge portions and discharge portions alternate consecutively around a circumference of the tire in a charge/discharge layer below a tread ply layer of the tire.

14. The method according to claim 11, wherein the plurality of charge portions include at least one element module, a rectifier and a resistor.

15. The method according to claim 14, wherein the at least one element module comprises:
- at least one piezoelectric element of the plurality of piezoelectric elements;
- an element module housing to mechanically support the at least one piezoelectric element;
- a lower conductive pressure pad on a top surface of the element module housing;
- an upper conductive pressure pad on a bottom surface of the element module housing, and
- wherein the element module housing is a lower durometer material than the piezoelectric elements such that compression force applied to the tire causes the piezoelectric elements to produce the electrical charge on the capacitor.

16. The method according to claim 11 wherein the discharge portion acts as pressure switch to discharge the capacitor in a time varying capacitor discharge current voltage through the transmitter coil, and the transmitter coil is configured to establish, in response to the time varying discharge current through the coil, a time varying magnetic field around the transmitter coil to transmit power to the receiver coil located on the vehicle.

17. The method according to claim 11, wherein the capacitor is a capacitor storage layer extending around the circumference of the tire which includes a first plate and a second plate that is spaced from the first plate, the transmitter coil includes a conductor, the conductor having a conductor first end, a conductor second end, and a portion forming a loop in a sidewall around a circumference of the tire, the loop having a first winding axis, the first winding axis being colinear with a center axis of the tire, the conductor first end is electrically coupled to the first plate and the conductor second end is coupled to the second plate.

18. The method according to claim 11, wherein the transmitter coil has a first winding axis, and further comprising:
- providing a receiver coil being supported by the vehicle;
- wherein the receiver coil has a second winding axis, the receiver coil is supported on the vehicle by a receiver coil support that is configured to align the second winding axis colinear with the first winding axis, and the receiver coil support is further configured to position the receiver coil relative to the transmitter coil such that, in response to a time varying magnetic field around the transmitter coil a time varying receiver coil current is induced through the receiver coil.

19. The method according to claim 18, wherein the receiver coil is connected to a conditioning circuit on the vehicle to supply power to the vehicle using the time varying receiver coil current, and wherein the transmitting coil is embedded in a sidewall structure of the tire such that upon the tire being mounted to a wheel to form a wheel-tire combination, and the wheel-tire combination is mounted to the vehicle, the winding axis is colinear with an axis of rotation of the wheel-tire combination.

20. A system for electromagnetic coupled powering of an electric vehicle comprising:
a plurality of charge portions and a plurality of discharge portions embedded in and consecutively arranged around a circumference in a charge/discharge layer below a tread ply layer of a tire configured for a vehicle, wherein the plurality of charge portions include a plurality of element modules each with at least one piezoelectric element, a rectifier and a resistor;
a capacitor embedded in the tire and electrically coupled to the plurality of piezoelectric elements, wherein the capacitor is a capacitor storage layer extending around the circumference of the tire which includes a first plate and a second plate that is spaced from the first plate, wherein the piezoelectric elements are configured to generate, in response to time variance over time of a compressive force on the piezoelectric element, a corresponding time-varying voltage difference between a top surface of the piezoelectric element and a bottom surface of the piezoelectric element, which induces a corresponding charging current to the capacitor;
a transmitter coil embedded in the tire and electrically coupled to the capacitor through the plurality of discharge portions, wherein the plurality of discharge portions act as a pressure switch to discharge the capacitor in a time varying capacitor discharge current voltage through the transmitter coil, and the transmitter coil is configured to establish, in response to the time varying discharge current through the coil, a time varying magnetic field around the transmitter coil;
wherein in response to an external radial pressure on the tire resulting from movement of the vehicle which causes a pressure on the plurality of piezoelectric elements, the plurality of piezoelectric elements produce an electrical charge on the capacitor, wherein the capacitor is a capacitor storage layer which includes a first plate and a second plate that is spaced from the first plate, the transmitter coil includes a conductor, the conductor having a conductor first end, a conductor second end, and a portion forming a loop in a sidewall around a circumference of the tire, the loop having a first winding axis, the winding axis being colinear with a center axis of the tire, the conductor first end is electrically coupled to the first plate and the conductor second end is coupled to the second plate, and
wherein the plurality of discharge portions electrically connect the electrical charge on the capacitor to the transmitter coil to send electromagnetic power to a receive coil on the vehicle to power the vehicle and charge vehicle batteries,
wherein the receiver coil is supported on the vehicle by a receiver coil support that is configured to align the receiver coil with the transmitter coil, and the receiver coil support is further configured to position the receiver coil relative to the transmitter coil such that, in response to the time varying magnetic field around the transmitter coil a time varying receiver coil current is induced through the receiver coil.

* * * * *